United States Patent
Gilbert

(10) Patent No.: US 9,361,881 B2
(45) Date of Patent: *Jun. 7, 2016

(54) METHOD AND APPARATUS FOR IDENTIFYING ACOUSTIC BACKGROUND ENVIRONMENTS BASED ON TIME AND SPEED TO ENHANCE AUTOMATIC SPEECH RECOGNITION

(71) Applicant: AT&T Intellectual Property II, L.P., Atlanta, GA (US)

(72) Inventor: Mazin Gilbert, Warren, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 51 days.

This patent is subject to a terminal disclaimer.

(21) Appl. No.: 14/312,116

(22) Filed: Jun. 23, 2014

(65) Prior Publication Data

US 2014/0303972 A1   Oct. 9, 2014

Related U.S. Application Data

(63) Continuation of application No. 11/754,814, filed on May 29, 2007, now Pat. No. 8,762,143.

(51) Int. Cl.

| G10L 15/00 | (2013.01) |
| G10L 21/00 | (2013.01) |
| G10L 15/20 | (2006.01) |
| G10L 15/30 | (2013.01) |
| G10L 15/065 | (2013.01) |

(52) U.S. Cl.
CPC ............... *G10L 15/20* (2013.01); *G10L 15/30* (2013.01); *G10L 15/065* (2013.01)

(58) Field of Classification Search
CPC ........ G10L 15/20; G10L 15/30; G10L 15/065
USPC .............................................. 704/233, 270.1
See application file for complete search history.

(56) References Cited

U.S. PATENT DOCUMENTS

| 5,749,073 | A | 5/1998 | Slaney |
| 5,842,165 | A | 11/1998 | Raman et al. |
| 5,960,397 | A | 9/1999 | Rahim |
| 7,412,382 | B2 * | 8/2008 | Noda et al. ................. 704/233 |
| 2003/0050783 | A1 * | 3/2003 | Yoshizawa .................. 704/270.1 |
| 2006/0030349 | A1 * | 2/2006 | Fabian et al. .............. 455/521 |
| 2007/0078652 | A1 | 4/2007 | Chang et al. |

* cited by examiner

*Primary Examiner* — Farzad Kazeminezhad

(57) ABSTRACT

Disclosed are systems, methods, and computer readable media for identifying an acoustic environment of a caller. The method embodiment comprises analyzing acoustic features of a received audio signal from a caller, receiving meta-data information based on a previously recorded time and speed of the caller, classifying a background environment of the caller based on the analyzed acoustic features and the meta-data, selecting an acoustic model matched to the classified background environment from a plurality of acoustic models, and performing speech recognition as the received audio signal using the selected acoustic model.

17 Claims, 4 Drawing Sheets

METHOD AND APPARATUS FOR IDENTIFYING ACOUSTIC BACKGROUND ENVIRONMENTS BASED ON TIME AND SPEED TO ENHANCE AUTOMATIC SPEECH RECOGNITION

PRIORITY INFORMATION

The present application is a continuation of U.S. patent application Ser. No. 11/754,814, filed May 29, 2007, the content of which is incorporated herein by reference in its entirety.

BACKGROUND OF THE INVENTION

1. Field of the Invention

The present invention relates generally to speech recognition technology and more specifically to identifying and classifying acoustic background environments based on meta-data and/or ambient noise and selecting an acoustic model from a group of predefined models for improved speech recognition.

2. Introduction

Currently, many automated speech recognition systems are in use. Such systems involve users calling from landline, mobile phones, computers via VoIP, or other communications devices and interacting with automated systems such as natural language spoken dialog systems. Background noise can increasingly interfere with speech recognition when calls are placed in automobiles, a subway, in an office, at a sporting event, or other noisy environments. Automated speech recognition systems mostly use Cepstral Mean Normalization in an attempt to minimize the effect of channel distortion, yet the systems remain highly sensitive to background noise, especially if the noise is dynamic or non-stationary. Two of these systems' shortcomings are that they rely on a large amount of speech before demonstrating performance improvements, and they tend to work well only in supervised mode where transcription is provided, which never happens in interaction with actual callers. These shortcomings make the automated speech recognition systems inaccurate which can frustrate callers to the point of hanging up.

Furthermore, many automated speech recognition systems seek to filter background noise prior to automatic speech recognition. Accordingly, what is needed in the art is a system for improving speech recognition in varying environments with varying types of background noise.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed herein are systems, methods, and computer readable media for identifying an acoustic environment of a caller. An exemplary method embodiment of the invention comprises analyzing acoustic features of a received audio signal from a caller using, for example, multi-state Gaussian Mixture Model (GMM) although Boosting and/or Maximum Entropy can also be used, receiving meta-data information, classifying a background environment of the caller based on the analyzed acoustic features and the meta-data, selecting an acoustic model matched to the classified background environment from a plurality of acoustic models, and performing speech recognition as the received audio signal using the selected acoustic model.

The principles of the invention may be utilized to provide, for example in a loud, dynamic environment like a construction site, enhanced automated speech recognition based on selecting an optimal acoustic model for the given environment based on background noise and meta-data.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
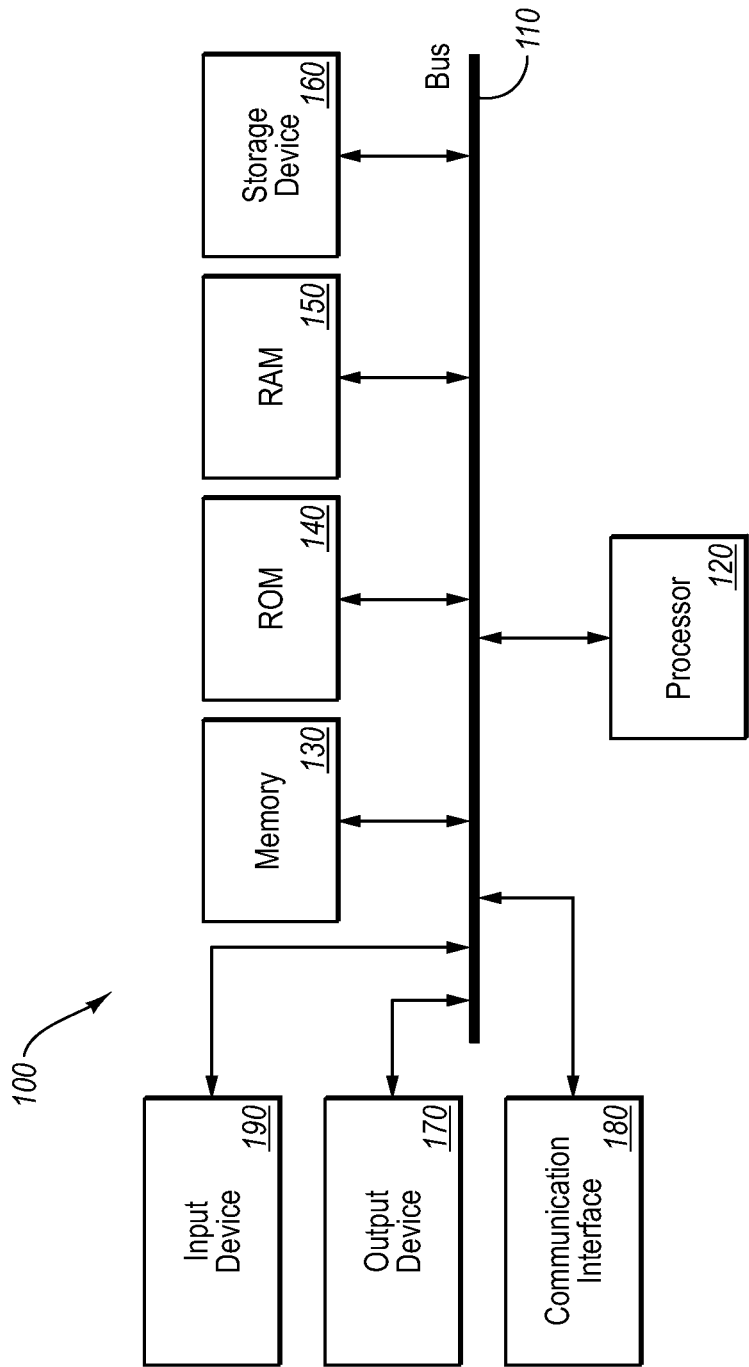
FIG. 1 illustrates a basic system or computing device embodiment of the invention.

With reference to FIG. 1, an exemplary system for implementing the invention includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS), containing the basic routine that helps to transfer information between elements within the computing device 100, such as during start-up, is typically stored in ROM 140. The computing device 100 further includes storage means such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch sensitive screen for gesture or graphical input, keyboard, mouse, motion input, speech and so forth. The input may be used by the presenter to indicate the beginning of a speech search query. The device output 170 can also be one or more of a number of output means. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative embodiment of the present invention is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Figure 2:
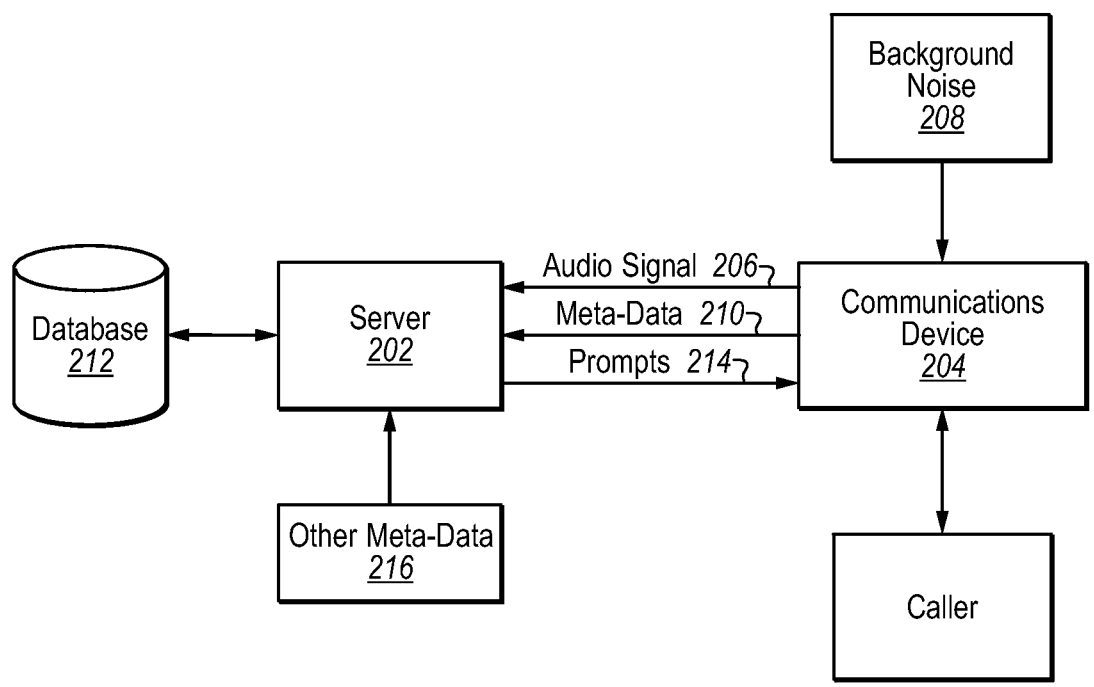
FIG. 2 illustrates an example speech recognition system which identifies a caller's background environment and meta-data and selects from a plurality of predefined acoustic models to enhance speech recognition.

The present invention relates to analyzing acoustic features of a received audio signal from a caller, receiving meta-data information which may or may not be associated with the caller, classifying a background environment of the caller based on the analyzed acoustic features and the analyzed meta-data, selecting an acoustic model matched to the classified background environment from a plurality of acoustic models, each of the plurality of acoustic models being generated for a particular predefined background environment, and performing speech recognition on the received audio signal using the selected acoustic model. FIG. 2 illustrates how the present invention may be applied to a caller on a telephone. The caller calls the server (202) with a communications device (204), in this case, a telephone. The telephone transmits an audio signal (206) containing the caller's speech and any background noise (208) in the environment. Analysis of the background noise may include examination of acoustic features such as estimates of background energy, signal-to-noise ratio, and spectral characteristics of the background environment. The telephone also transmits meta-data (210) to the server. In the case of a telephone, the meta-data includes Automatic Number Identification (ANI) information.

The ANI identifies not only the caller's telephone number, but also the number dialed and the class of service (i.e. payphone, cellular phone, prison phone, call to a recently disconnected number, etc.). ANI information is invaluable meta-data, but other devices, such as cell phones or VoIP phones or computers may provide other additional meta-data which the invention could exploit.

Other meta-data (216), such as IP addresses, network identification numbers like MAC addresses, GPS-reported location and elevation, Uniform Resource Locator (URL) address, personal profile, rate of movement, etc., could be transmitted by other communications devices. Other meta-data may also include such things as time of day, day of the week, or meta-data about the caller could be accessed from a database. Based on the audio signal and meta-data, the server classifies the background environment of the caller. The server then selects an acoustic model from a database of predefined acoustic models (212) which may include models for an office, airport, street, vehicle, train, home, etc. These models may be optimized for different variations of a location. An example of variations of a location could be based on two levels, a first general acoustic environment such as an office or car, and a second specific acoustic environment, such as a quiet office and a loud office or a car on a residential road and a car on the freeway. The server performs speech recognition on the audio signal using the selected optimal acoustic model. In some cases, prompts (214) may be sent back to the communications device, for example to prompt the user to speak more slowly, speak more clearly, or move to a quieter location based on the identified background environment. The form of the prompt depends on the communications device. Prompts may be audible, pictorial, audiovisual, text, making the communications device vibrate, or any combination; the prompts the server returns are only limited by the expressive ability of the communications device.

Figure 3:
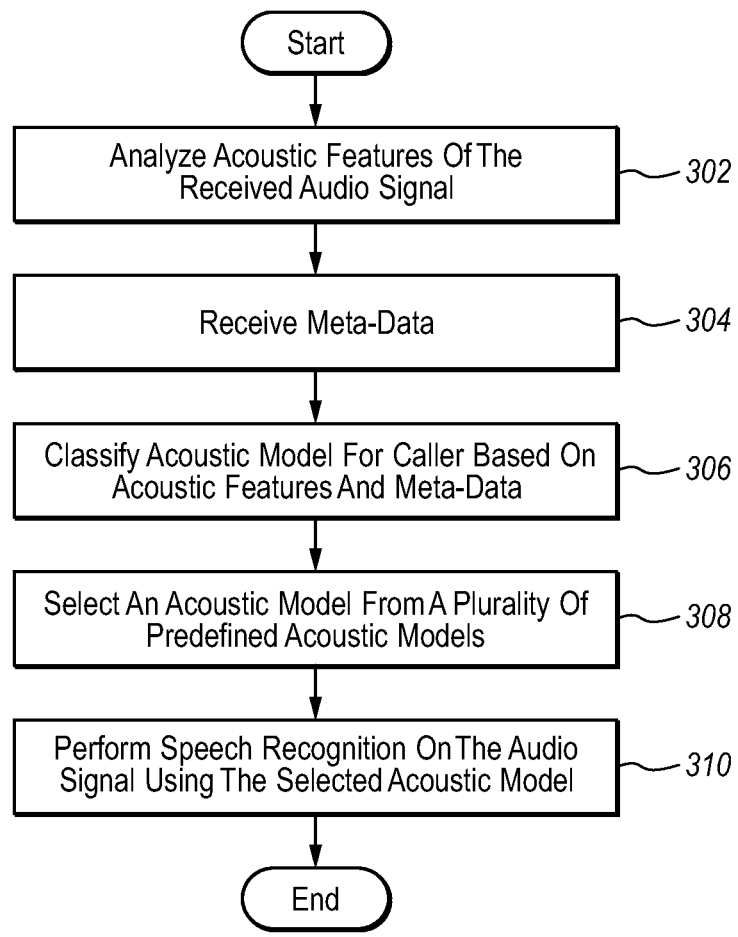
FIG. 3 illustrates a method embodiment of the invention.

FIG. 3 illustrates the method of identifying the acoustic environment of a caller. The method is most useful for calls placed in a noisy acoustic environment like a subway, with screaming children in the background, or on a subway with screaming children. First, the system analyzes the acoustic features of a caller's audio signal (302) for familiar sounds which could identify the caller's environment, such as a dog barking, cars honking, or a copy machine. Second, the system analyzes meta-data about the caller (whether provided by the phone or some other means) (304). Meta-data could include information such as ANI information, time of day, GPS-provided location or elevation, the last used acoustic model, type of communications device (IP phone, landline, speakerphone), personal profile information, etc. Third, the system classifies the background environment of the caller based on the provided audio signal and meta-data (306). For example, if the caller calls every day at the same time while commuting home from work, the meta-data provided about time, location, and speed in combination with the background noise in the audio signal would assist in selecting an appropriate acoustic model. This may be useful because knowing the habits of the caller may provide a high probability that the caller is in a particular environment at a particular time.

Fourth, the system selects an acoustic model from a plurality of predefined acoustic models (308). These acoustic models could be optimized for speech recognition in an office, at home, on the street, in a vehicle, on a train, etc. This database of predefined acoustic models need not be static. As new environments are used more frequently, new acoustic models could be developed and added to the database. Fifth, the system performs speech recognition on the audio signal using the selected acoustic model (310). The acoustic model is optimal after analyzing the audio signal and meta-data so as to provide clearer speech recognition. Through the duration of the call, the server may periodically monitor the audio signal for changes. As the audio signal changes, different acoustic models may be selected for use or additional prompts sent to the communication device.

An additional embodiment for the method relates to providing transcription of recorded voice mails. An exemplary system which may be used with this aspect of the invention may comprise a single computing device, a plurality of networked computing devices, or any other device or set of devices capable of performing the steps in the functionality disclosed herein. An example context for use in this aspect of the invention would be where a caller attempts to call someone who is unavailable to answer their phone. As is known in the art, the caller is then transferred to a voice mail system. The system may employ prompts before, during, or immediately after the voicemail to solicit additional meta-data if needed. The system may prompt the caller with language such as "To leave a message press 1, to transcribe a message press 2, . . . " In this context, the system may be able to provide prompts or receive additional audio information that may assist in the basic process of receiving both audio information and meta-data to aid in selecting an appropriate acoustic model which may be used to transcribe the recorded voice mail. The system may provide one or more prompts to gather meta-data and/or extend the dialogue with the user to gather further audio information which may include speech and/or background noise for analysis.

The system may state something like the following: "This voice mail is intended to be transcribed. If you are in an office, press 1. If you are in the street, press 2. If you are in a train, press 3 . . . " Through an analysis of the audio and meta-data gathered thus far, the system may have made a threshold decision regarding the environment of the caller. Accordingly the particular prompt may be modified based on a confidence level that the background is a particular environment or based on any other information available to the system.

If the system has a high confidence level that the user is in an office environment, the system may offer a simpler confirmation prompt to the user. Such a prompt may be: "To leave a message press 1." When the user presses 1, a further prompt may continue: "To confirm that you are in an office environment, press 5 and continue to leave your message." If the system has a low confidence level and determines that there is an equal likelihood that the user is in a train or on the street, the system may select a more complex prompt in which the user has more options to inform the system regarding the environment. Accordingly the general concept of this aspect of the invention provides much flexibility for the system to interact with the user in the context of the user leaving a voicemail message that is to be later transcribed wherein the system can gather additional meta-data useful in selection or switching to the optimal acoustic model for automated speech recognition.

Prompts may be presented at any stage of the call. An example of a pre-voice mail prompt could be "Dial 1 for Marty. Dial 2 for Biff." Another example of a pre-voice mail prompt would be asking the user if the acoustic model is correct. An audio prompt might confirm if the most likely acoustic model is correct by asking "Are you in an office?" or "Are you at home?" and based on the caller's response, additional prompts could offer other likely acoustic models or a list of common acoustic models by asking "Press 1 if you are in the subway, Press 2 if you are in a vehicle on the freeway, Press 3 if you are in a vehicle in the city." These responses to prompts provide valuable meta-data for confirming and optimizing the proper acoustic model as well as allowing the system to receive additional cues in the audio signal to aid in classifying the background environment.

In one aspect, the system may prompt the caller mid-voice mail. One prompt that is known in the art is a prompt informing the caller that there are 15 seconds left before the voice mail will automatically terminate. If the certainty in the selection of an acoustic model drops below a certain threshold, the system may prompt the caller mid-voice mail to verify that the acoustic environment has changed. The system may prompt the user to verify the current selection is correct by asking "Are you still in an office?" or "Have you moved to a subway?" The system could also present the caller with the option of including or excluding the mid-voice mail dialogue in the recorded voice mail. This option is desirable when the caller doesn't want to interrupt the voice message with part of the mid-voice mail dialogue and would rather risk a reduced quality transcription. The dialogues discussed herein may also be presented multimodally. For example, while the user is on his handheld device leaving voice mail, a dialog prompt may be presented on the display screen: "Have you left the office?" The user could then respond via a touch sensitive pad, buttons, or similar interfaces that indicate yes or no.

As a specific example of a dialog capable of multimodal communication and input, if a call is placed and the party is unavailable, the phone could vibrate to get the attention of the user, then display a message on the screen asking the user to press a button to leave a message and immediately turn on speaker phone so the user may set down the phone and leave a message as the user goes about other business.

A multimodal dialog does not require interaction from the user. A simple display could pop up on the screen with a message for the user.

An example of a post-voice mail prompt is asking the caller to verify his phone number, location, or environment. After the voice mail is done, the system may prompt the user "In order to provide quality assurance of the voice mail transcription, please state your location" or "In order to ensure the most accurate transcription, please press 1 if you are in an office, press 2 if you are at home, . . . " This additional meta-data could be used to select a better acoustic model. Of course, any of the prompts may be provided multimodally.

The acoustic signal and meta-data are analyzed to select an acoustic model from a plurality of predefined acoustic models. The acoustic model is applied to perform speech recognition on the audio signal. Throughout the voice mail, the audio signal may be analyzed for changes and the optimal acoustic model may be changed. Voice mail transcripts could be stored on the server for future retrieval, read back to the caller, or used in any other way.

Another aspect relates to providing closed captioning services of live broadcasts, such as on-site news reports or sporting events. The main difference between this embodiment and other embodiments is the lack of prompting, the types of meta-data, and the addition of a video signal. As live television is a broadcast, a one-way communication, there is no opportunity to send prompts for additional meta-data or for anything else. Meta-data could be gleaned through analysis of the incoming text, use of Optical Character Recognition (OCR) of logos and station identification marks in the video signal, or other sources. When performing initial speech recognition, the text itself may provide meta-data. For example, if the speech contains the words quarter, points, goal, or other sports related terms, the certainty threshold that the signal is a sporting event is higher, whereas if the speech contains words like congress, Middle East, or weather, the certainty threshold that the signal is a newscast is higher. OCR may also provide valuable meta-data. As an example, CNN's logos indicate almost exclusively news reports and other professionally produced news media while ESPN's logos and other indicia indicate sporting events. Other meta-data could include the time of day and broadcast channel. For example, local broadcast at 6:00 p.m. is probably the nightly news. One important piece of meta-data is that television audio signals are professionally produced and generally use high quality microphones which more effectively filter outside noise. The background environment is determined by analyzing the audio signal and meta-data together. Some examples of predefined background environments include city street, football stadium, or site of an accident (including ambulance and police sirens). An acoustic model is selected from a plurality of predefined acoustic models. Speech recognition is performed on the incoming audio signal using the optimal acoustic model to provide text for closed captioning.

Figure 4:
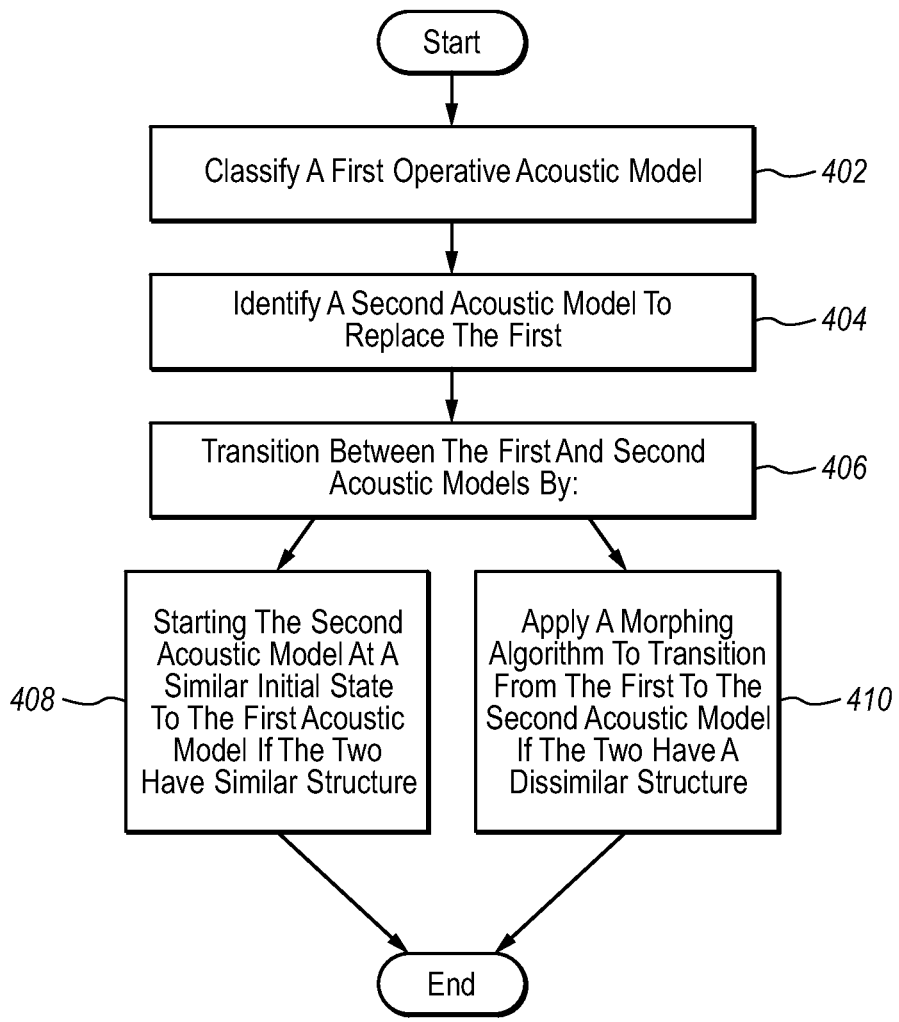
FIG. 4 illustrates a method embodiment for transitioning between two acoustic models.

FIG. 4 illustrates an additional exemplary method embodiment of the invention which relates to a transition between acoustic models in situations when a first acoustic model is operative and thereafter a different second acoustic model is selected to substitute the first. For example, a caller might start a call in his car then walk in to a home or a caller might start a call in a loud office and shut his office door changing the environment to a quiet office. First, the method identifies the operative first acoustic model (402). Second, the method identifies a second acoustic model (404). The second acoustic model could be the result of the caller abruptly changing location, the background environment subtly changing, or any other event that shifts the selected acoustic model away from optimal. Third, during a call, a transition is initiated between the first and second environments (406). The transition may occur over a very short period of time for a fast transition or may occur over a longer period of time if the transition is a gradual one. The type of transition is determined by the similarity between the two background environments. If the first acoustic model and the second acoustic model have similar structure, the second acoustic model may be started at a similar initial state to the ending state of the first acoustic model (408).

For example, when a caller in a loud office shuts his door mid-call, the loud office environment changes to a quiet office environment, the quiet office acoustic model could be started in an initial state similar to the ending state of the loud office acoustic model to ease the transition. If the first acoustic model and the second acoustic model have dissimilar structure, a morphing algorithm could be applied to smooth the transition from the first acoustic model to the second acoustic model (410). For example, a transition from an acoustic model optimized for use in a car could be vastly different from an acoustic model optimized for use in a home. Separately developed models would have different structures. A morphing algorithm can be used to smooth the transition over a period of time to continue to provide the optimal acoustic model for the voice signal. The morphing algorithm could be applied at a phone level, if the phone or other communications device is capable of performing such algorithms.

Embodiments within the scope of the present invention may also include tangible computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, applying acoustic models to voice-enabled IPTV could assist in identifying background environments to enhance automated speech recognition. Accordingly, the appended claims and their legal equivalents should only define the invention, rather than any specific examples given.

I claim:

1. A method comprising:
   analyzing acoustic features of a received audio signal from a communication device;
   identifying a repeating pattern of meta-data associated with the acoustic features, wherein the repeating pattern of meta-data comprises a speed of a caller associated with the communication device;
   classifying a background environment of the caller based on the acoustic features and the repeating pattern of meta-data, to yield a background environment classification;
   selecting an acoustic model matched to the background environment classification from a plurality of acoustic models; and performing speech recognition on the received audio signal using the acoustic model.

2. The method of claim 1, wherein the background environment classification comprises one of office, airport, street, vehicle, train and home.

3. The method of claim 2, wherein the background environment is classified based on two levels comprising a first level from the listing of background environments and a second, finer, level based on specific geographic location.

4. The method of claim 1, wherein the acoustic features comprise one of estimates of background energy, signal-to-noise ratio, and spectral characteristics of the background environment.

5. The method of claim 1, where the meta-data comprises one of global positioning system coordinates, elevation, automatic number identification information, computing device identification number (comprised of an internet protocol address or MAC address), uniform resource locator address, individual environmental habits, personal profile information, time, and rate of movement.

6. The method of claim 1, wherein the meta-data comprises personal information associated with the caller and comprises probabilities that the caller is in a particular background environment.

7. The method of claim 1, wherein speech recognition is applied to provide speech transcription of the audio signal.

8. The method of claim 1, further comprising:
classifying a first background environment in a call and thereafter classifying a second background environment; and
transitioning from a first acoustic model associated with the first background environment to a second acoustic model associated with the second background environment by:
starting the second acoustic model at an initial state similar to an ending state of the first acoustic model when the first acoustic model and the second acoustic model have similar structure; and
applying a morphing algorithm to the transition from the first acoustic model to the second acoustic model if the first acoustic model and the second acoustic model have dissimilar structures.

9. A system comprising:
a processor; and
a computer-readable storage medium having instructions stored which, when executed by the processor, cause the processor to perform operations comprising:
analyzing acoustic features of a received audio signal from a communication device;
identifying a repeating pattern of meta-data associated with the acoustic features, wherein the repeating pattern of meta-data comprises a speed of a caller associated with the communication device;
classifying a background environment of the caller based on the acoustic features and the repeating pattern of meta-data, to yield a background environment classification;
selecting an acoustic model matched to the background environment classification from a plurality of acoustic models; and
performing speech recognition on the received audio signal using the acoustic model.

10. The system of claim 9, wherein the background environment classification comprises one of office, airport, street, vehicle, train and home.

11. The system of claim 10, wherein the background environment is classified based on two levels comprising a first level from the listing of background environments and a second, finer, level based on specific geographic location.

12. The system of claim 9, wherein the acoustic features comprise one of estimates of background energy, signal-to-noise ratio, and spectral characteristics of the background environment.

13. The system of claim 9, where the meta-data comprises one of global positioning system coordinates, elevation, automatic number identification information, computing device identification number (comprised of an internet protocol address or MAC address), uniform resource locator address, individual environmental habits, personal profile information, time, and rate of movement.

14. The system of claim 9, wherein the meta-data comprises personal information associated with the caller and comprises probabilities that the caller is in a particular background environment.

15. The system of claim 9, wherein speech recognition is applied to provide speech transcription of the audio signal.

16. A computer-readable storage device having instructions stored which, when executed by a computing device, cause the computing device to perform operations comprising:
analyzing acoustic features of a received audio signal from a communication device;
identifying a repeating pattern of meta-data associated with the acoustic features, wherein the repeating pattern of meta-data comprises a speed of a caller associated with the communication device;
classifying a background environment of the caller based on the acoustic features and the repeating pattern of meta-data, to yield a background environment classification;
selecting an acoustic model matched to the background environment classification from a plurality of acoustic models; and
performing speech recognition on the received audio signal using the acoustic model.

17. The computer-readable storage device of claim 16, wherein the acoustic features comprise one of estimates of background energy, signal-to-noise ratio, and spectral characteristics of the background environment.

* * * * *